US008320887B2

(12) United States Patent
Wingett et al.

(10) Patent No.: US 8,320,887 B2
(45) Date of Patent: Nov. 27, 2012

(54) MOBILE COMMUNICATION APPARATUS AND METHOD FOR ALERTING USERS BY LIGHT SOURCES WITH TIME-VARYING ILLUMINATIVE EFFECTS

(75) Inventors: Gary Wingett, Hampshire (GB); Thomas Jenkins, London (GB); Daniel Wilkinson Gratiot, London (GB)

(73) Assignee: Nokia Corporation, Espoo (FI)

( * ) Notice: Subject to any disclaimer, the term of this patent is extended or adjusted under 35 U.S.C. 154(b) by 625 days.

(21) Appl. No.: 12/221,618

(22) Filed: Aug. 5, 2008

(65) Prior Publication Data

US 2010/0035582 A1    Feb. 11, 2010

(51) Int. Cl.
*H04M 1/725* (2006.01)
(52) U.S. Cl. .................. 455/412.2; 455/550.1; 455/567; 455/566; 455/556.2; 455/412.1; 340/540; 345/170; 345/168
(58) Field of Classification Search .................. 455/566, 455/567, 412.2, 550.1, 575; 340/540; 345/170, 345/168
See application file for complete search history.

(56) References Cited

U.S. PATENT DOCUMENTS

| 7,120,471 B2 * | 10/2006 | Deeds ........................... 455/566 |
| 7,266,397 B2 | 9/2007 | Sato et al. ..................... 455/575 |
| 2003/0176205 A1 * | 9/2003 | Oota et al. ..................... 455/567 |
| 2004/0110540 A1 | 6/2004 | Sato et al. ..................... 455/566 |
| 2007/0146332 A1 | 6/2007 | Kim et al. ..................... 345/170 |
| 2007/0173291 A1 * | 7/2007 | Morotomi ..................... 455/566 |

FOREIGN PATENT DOCUMENTS

| KR | 2004-0016788 | 2/2004 |
| KR | 0755862 | 9/2007 |

OTHER PUBLICATIONS

Touch Diamond User Manual Brochure, HTC Smart Mobility, 22 pages, "Chapter 1, 1.3 Charging the Battery", copyright 2008, Publication Date Unknown.

* cited by examiner

*Primary Examiner* — Jean Gelin
*Assistant Examiner* — Babar Sarwar
(74) *Attorney, Agent, or Firm* — Harrington & Smith (57) ABSTRACT

An apparatus, including: a light source; a controller configured, in response to the occurrence of a first event involving the apparatus, to control the light source to produce a first, time-varying, illuminative effect that varies between maxima and minima of illumination intensity over a period of time following the occurrence of the first event, wherein the variation in the first illuminative effect is indicative to a user that the first event has occurred; and the controller being further configured, in response to the occurrence of a second event involving the apparatus, to control the light source to produce a second, time-varying, illuminative effect that varies between maxima and minima of illumination intensity over a period of time following the occurrence of the second event, wherein the variation in the second illuminative effect is indicative to a user that the second event has occurred.

29 Claims, 5 Drawing Sheets

MOBILE COMMUNICATION APPARATUS AND METHOD FOR ALERTING USERS BY LIGHT SOURCES WITH TIME-VARYING ILLUMINATIVE EFFECTS

FIELD OF THE INVENTION

Embodiments of the present invention relate to user alerts. In particular, some embodiments relate to an apparatus, a method, or a computer program for alerting/informing a user of the occurrence of one or more events.

BACKGROUND TO THE INVENTION

Electronic apparatuses may be configured to alert a user to an event. For example, a mobile telephone may emit an audible alert when a paging message relating to an incoming call has been received, or when a text message has been received.

BRIEF DESCRIPTION OF VARIOUS EMBODIMENTS OF THE INVENTION

Embodiments of the invention provide alternative ways of informing a user of events.

According to various, but not necessarily all embodiments of the invention, there is provided an apparatus, comprising: a light source; a controller configured, in response to the occurrence of a first event involving the apparatus, to control the light source to produce a first, time-varying, illuminative effect that varies between maxima and minima of illumination intensity over a period of time following the occurrence of the first event, wherein the variation in the first illuminative effect is indicative to a user that the first event has occurred; and the controller being further configured, in response to the occurrence of a second event involving the apparatus, to control the light source to produce a second, time-varying, illuminative effect that varies between maxima and minima of illumination intensity over a period of time following the occurrence of the second event, wherein the variation in the second illuminative effect is indicative to a user that the second event has occurred.

According to various, but not necessarily all embodiments of the invention, there is provided a method, comprising: controlling a light source of an apparatus, in response to the occurrence of a first event involving the apparatus, to produce a first, time-varying, illuminative effect that varies between maxima and minima of illumination intensity over a period of time following the occurrence of the first event, wherein the variation in the first illuminative effect is indicative to a user that the first event has occurred; and controlling the light source, in response to the occurrence of a second event involving the apparatus, to produce a second, time-varying, illuminative effect that varies between maxima and minima of illumination intensity over a period of time following the occurrence of the second event, wherein the variation in the second illuminative effect is indicative to a user that the second event has occurred.

According to various, but not necessarily all embodiments of the invention, there is provided an apparatus, comprising: light emitting means; means for controlling the light emitting means, in response to the occurrence of a first event involving the apparatus, to produce a first, time-varying, illuminative effect that varies between maxima and minima of illumination intensity over a period of time following the occurrence of the first event, wherein the variation in the first illuminative effect is indicative to a user that the first event has occurred; and means for controlling the light emitting means, in response to the occurrence of a second event involving the apparatus, to produce a second, time-varying, illuminative effect that varies between maxima and minima of illumination intensity over a period of time following the occurrence of the second event, wherein the variation in the second illuminative effect is indicative to a user that the second event has occurred.

According to various, but not necessarily all embodiments of the invention, there is provided an apparatus, comprising: a display; a key arrangement at a first location, separated from the display, the key arrangement comprising a user output device, different to the display; a controller configured, in response to the occurrence of a first event involving the apparatus, to control the user output device to provide a first output at the first location to a user, indicating that the first event has occurred, and configured, in response to the occurrence of a second event involving the apparatus, to control the user output device to provide a second output at the first location to the user, indicating that both the first event and the second event have occurred.

According to various, but not necessarily all embodiments of the invention, there is provided a method, comprising: in response to the occurrence of a first event involving an apparatus comprising a display and a key arrangement at a first location, separated from the display, the key arrangement comprising a user output device, different to the display, controlling the user output device to provide a first output at the first location to a user, indicating that the first event has occurred; and controlling, in response to the occurrence of a second event involving the apparatus, the user output device to provide a second output at the first location to the user, indicating that both the first event and the second event have occurred.

According to various, but not necessarily all embodiments of the invention, there is provided an apparatus, comprising: display means; a key arrangement at a first location, separated from the display means, the key arrangement comprising user output means, different to the display means; means for controlling the user output means, in response to the occurrence of a first event involving the apparatus, to provide a first output at the first location to a user, indicating that the first event has occurred; and means for controlling the user output means, in response to the occurrence of a second event involving the apparatus, to provide a second output at the first location to the user, indicating that both the first event and the second event have occurred.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

The Figures illustrate an apparatus 10 comprising a controller 12 and a user output device 24. Following the occurrence 300 of a first event involving the apparatus 10, the controller 12 controls 310 the user output device 24 to provide a first output 70. Subsequently, following the occurrence 320 of a second event involving the apparatus 10, the controller 12 controls 330 the user output device 24 to produce a second output 72.

In some embodiments of the invention, the first and second outputs 70, 72 occur at the same location and are used to indicate the history of events that have occurred at the apparatus 10. In these embodiments, the apparatus 10 may further comprise a display 20 and a key arrangement 18 at a first location 34, separated from the display 20. The key arrangement 18 comprises the user output device 24. The first output from the user input device 24 indicates to a user that the first event has occurred and the second output indicates that both the first event and the second event have occurred.

In some embodiments of the invention, the first and second outputs 70, 72 are illuminative effects. The first illuminative effect 70 may indicate that a first event has occurred at the apparatus 10. The second illuminative effect 72 may indicate that a second event has occurred at the apparatus 10, or it may indicate a history of events that have occurred at the apparatus 10 (i.e. it may indicate that both the first event and the second event have occurred). In these embodiments, the user output device 24 comprises a light source 25. The first and second outputs provided by the light source 25 may be time-varying, illuminative effects that vary between maxima and minima of illumination intensity over a period of time. The variation in the first illuminative effect is indicative to a user that the first event has occurred. The variation in the second illuminative effect is indicative to a user that the second event has occurred.

Figure 1:
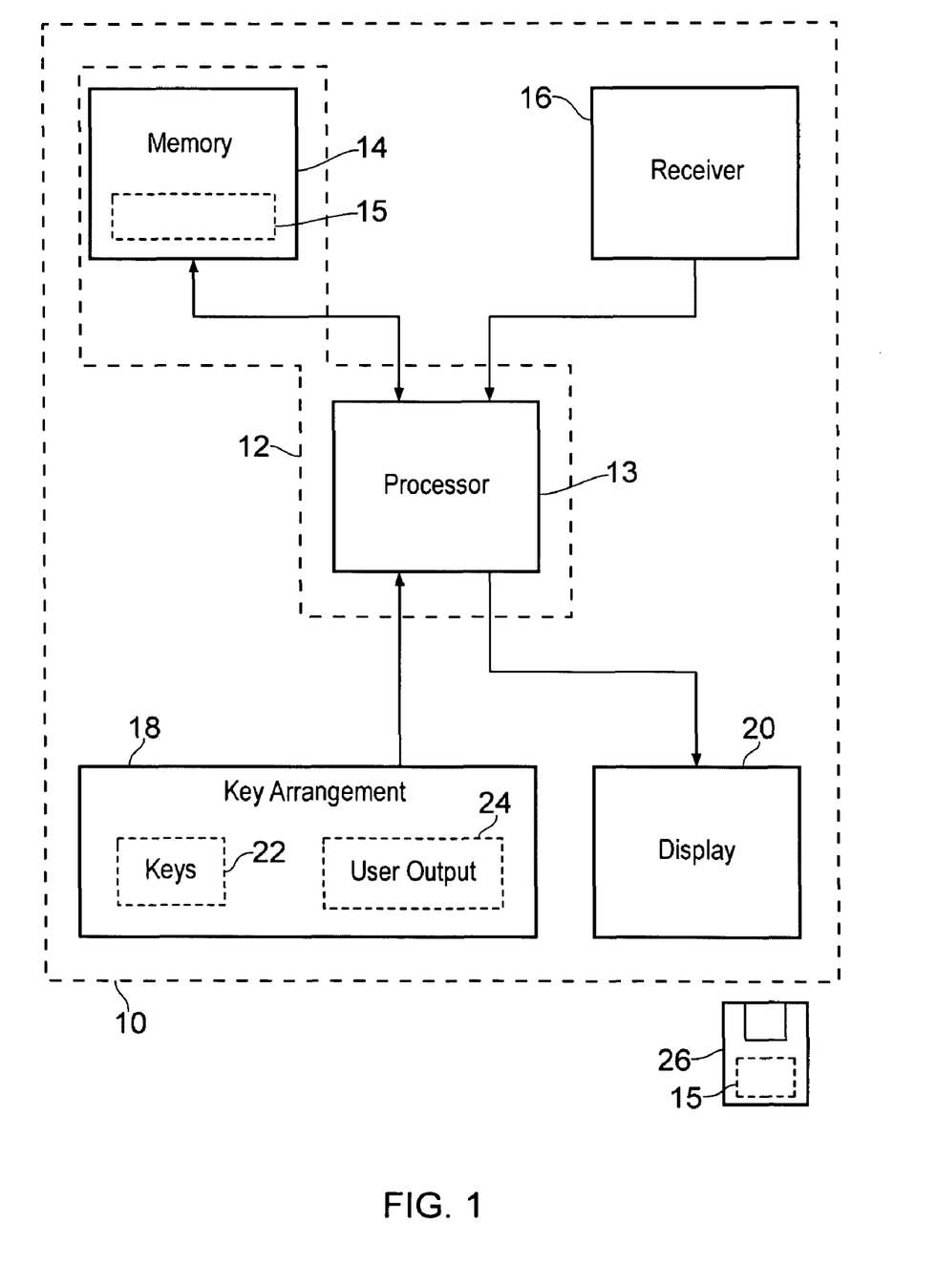
FIG. 1 is a functional schematic of an apparatus.

In more detail, FIG. 1 illustrates a schematic of an apparatus 10. The apparatus 10 may be, for example, a hand portable electronic apparatus such as, for example, a personal digital assistant, a personal music player or a mobile cellular telephone. The apparatus 10 comprises a processor 13, a memory 14, a key arrangement 18 and a display 20. In the illustrated example, the apparatus 10 is a communications device and comprises a receiver 16.

The processor 13 is operationally coupled to each of the memory 14, the receiver 16, the key arrangement 18 and the display 20. While FIG. 1 illustrates that there are no intervening elements between the processor 13 and each of the memory 14, the receiver 16, the key arrangement 18 and the display 20 respectively, any number or combination of intervening elements can exist in practice (including no intervening elements).

The receiver 16 may be for receiving radio frequency signals. For example, the receiver 16 may be configured to receive signals from a base station. It may also be part of a transceiver that enables the apparatus 10 to operate as a mobile cellular telephone.

The key arrangement 18 comprises keys 22 and a user output device 24. In some embodiments of the invention, the user output device 24 may comprise a light source 25 (see FIGS. 5A and 5B).

The processor 13 is configured to read from and write to the memory 14. The processor 13 is also configured to provide an output to the display 20 and to receive inputs from the receiver 16 and the key arrangement 18.

The processor 13 and the memory 14 may form a controller 12. Implementation of controller 12 can be in hardware alone (e.g. a circuit, a processor . . . ), have certain aspects in software including firmware alone or can be a combination of hardware and software (including firmware).

The controller 12 may be implemented using instructions that enable hardware functionality, for example, by using executable computer program instructions in a general-purpose or special-purpose processor that may be stored on a computer readable storage medium 26 (e.g. disk, memory etc) to be executed by such a processor.

The processor 13 may comprise an output interface via which data and/or commands are output by the processor 13 and an input interface via which data and/or commands are input to the processor 13.

The memory 14 stores a computer program comprising computer program instructions 15 that control the operation of the apparatus 10 when loaded into the processor 13. The computer program instructions 15 provide the logic and routines that enables the apparatus 10 to perform, for example, the methods illustrated in FIG. 3. The processor 13 is able to load and execute the computer program by reading the memory 14.

Figure 3:
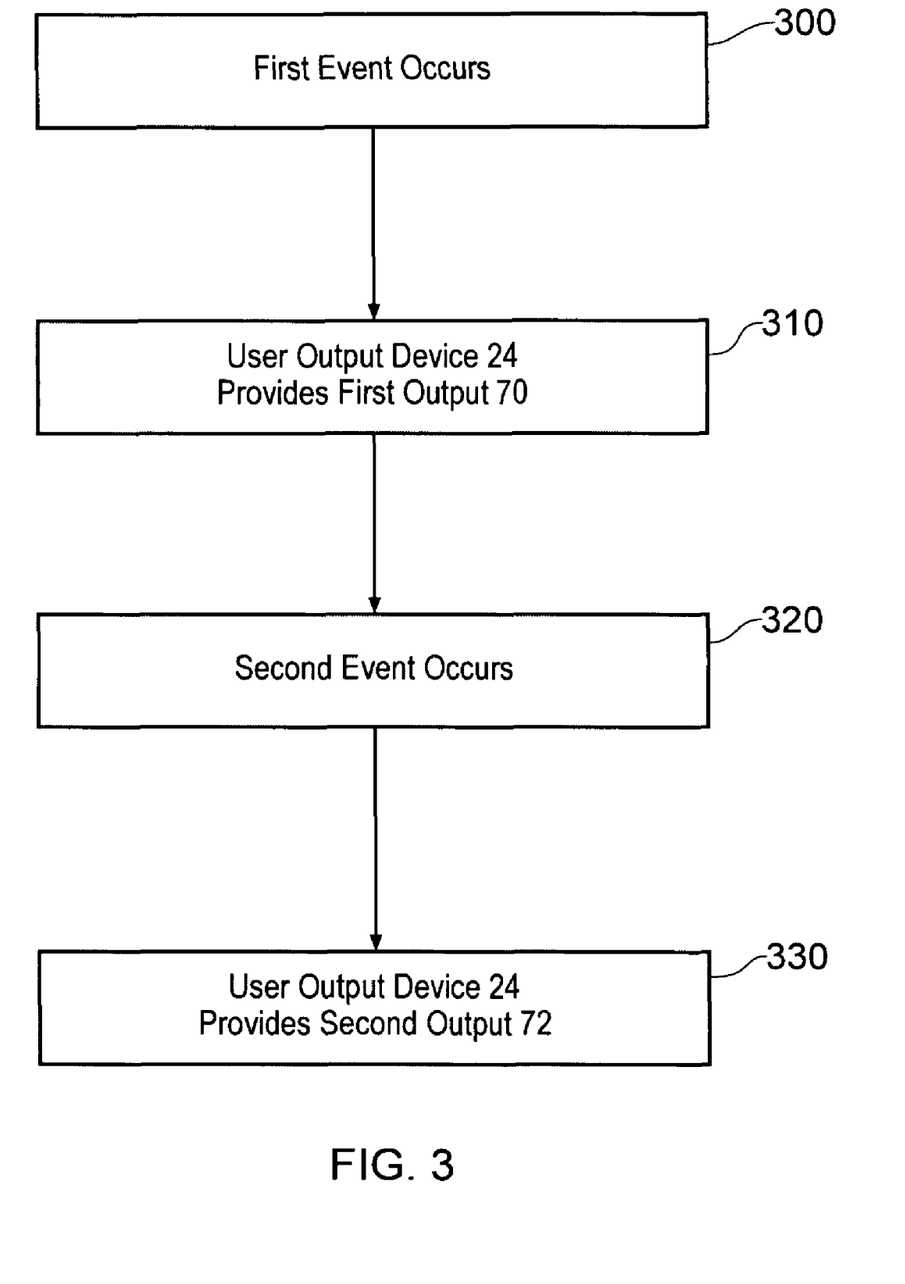
FIG. 3 is a flow diagram of a method in accordance with embodiments of the invention.

The blocks illustrated in FIG. 3 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

The computer program may arrive at the apparatus 10 via any suitable delivery mechanism 26. The delivery mechanism 26 may be, for example, a computer-readable storage medium, a computer program product, a memory device, a record medium such as a CD-ROM or DVD, an article of manufacture that tangibly embodies the computer program. The delivery mechanism may be a signal configured to reliably transfer the computer program. The apparatus 10 may propagate or transmit the computer program as a computer data signal.

Although the memory 14 is illustrated as a single component, it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 2:
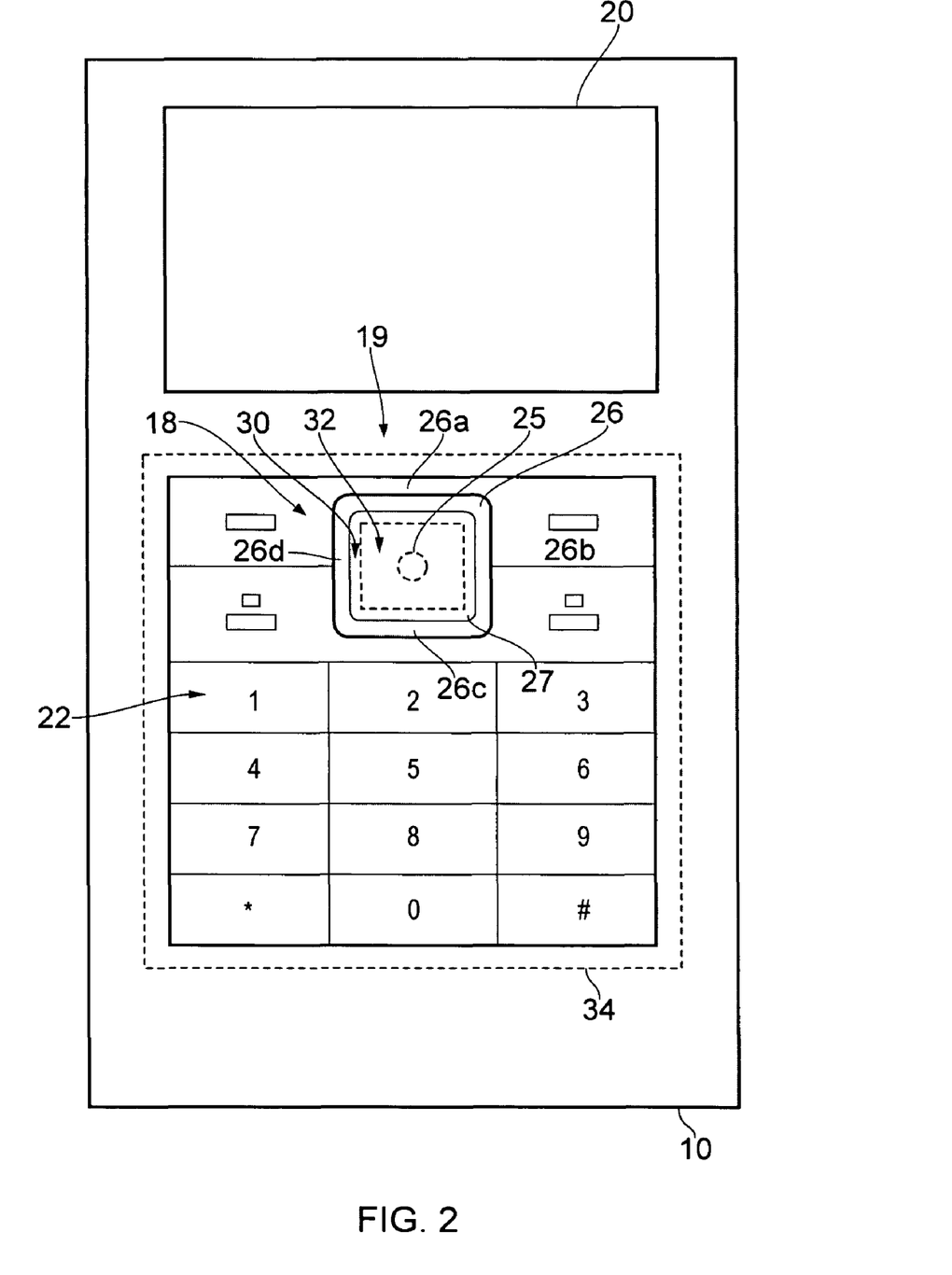
FIG. 2 illustrates the exterior front face of the apparatus.

FIG. 2 illustrates an exterior front face of the apparatus 10. In this example, the exterior front face is substantially planar. An exterior housing portion 19 separates the display 20 from the key arrangement 18 on the front face.

The key arrangement 18 illustrated is one example of many possible different key arrangements. The illustrated key arrangement 18 comprises a plurality of discrete keys 22 that are dedicated to user input. The plurality of keys 22 comprises four navigation keys 26a, 26b, 26c and 26d and a selection key 27. The upper surface of the navigation keys 26a-26d may be actuated by a user to navigate through menus by highlighting items that are displayed on the display 20. The upper surface of the selection key 27 may be actuated by a user to select an item that is highlighted on the display 20.

The selection key 27 may be actuated by depressing it in a direction that is substantially perpendicular to the substantially planar front face of the apparatus 10. In order to aid movement of the key 27, a recess may separate it from an adjacent portion of the substantially planar face. For example, in the illustrated embodiment, a recess separates the selection key 27 from the navigation keys 26a-26d.

The selection key 27 may be associated with a user output device 24 and, in some embodiments, may comprise the user output device 24. In this particular example, the user output device 24 is a light source 25 that is located beneath the upper surface of the selection key 27. The light source 25 is configured to produce a plurality of illuminative effects via the key 27, by transmitting light through the upper surface of the selection key 27.

The upper surface of the selection key 27 may be an opaque, black color. That is, when no light is being transmitted, the whole of the upper surface area 30, 32 of the selection key 27 is seen to be black in color.

In this example, the structure of the selection key 27 is such that when light source 25 emits light, a ring of diffused light is emitted from an area 30 that follows the outer edge of the upper surface of the selection key 27. No light, however, is emitted from the inner part 32 of the upper surface area 30, 32 of the selection key 27. The distinction between the inner 32 and outer parts 30 of the upper surface area of the selection key 27 is made by a dotted line in FIG. 2. A more detailed description of one possible structure of the selection key 27 is provided below in reference to FIGS. 5A and 5B.

The emitted ring of diffused light provides the selection key 27 with an "aura" or an ambient, "halo-like" glow. It should be appreciated that the transmission of light through the selection key 27 produces completely different illuminative effects to those provided by the backlight of a display. For example, the light emanating from the upper surface of the selection key 27 in this example is softer and more diffused than that typically produced by the backlight of a display and is incapable of being used to display text.

The light emitted by the light source 25 may be of any color. It may be that the light source emits only one color at a time or emits multiple colors at a time. The color of the emitted light may be light blue, for example.

FIG. 3 illustrates a method in accordance with embodiments of the invention. At block 300 of FIG. 3, a first event occurs involving the apparatus 10. At block 310, following the occurrence of the first event, the controller 12 controls the user output device 24 to provide a first output 70, in order to indicate to the user that the first event has occurred. The first output 70 may be a first illuminative effect provided by the light source 25.

At block 320 of FIG. 3, a second event occurs involving the apparatus 10. At block 330, following the occurrence of the second event, the controller 12 controls the user output device 24 to provide a second output, in order to indicate to the user that the second event has occurred. The second output 72 may be a second illuminative effect provided by the light source 25.

In more detail, in one implementation, the apparatus 10 is a mobile telephone and, at block 300, an incoming call is missed by the user. At block 310, in response to the incoming call being missed, the controller 12 controls the light source 25 of the key arrangement 18 to produce a first illuminative effect 70 by transmitting light through the selection key 27.

Figure 4:
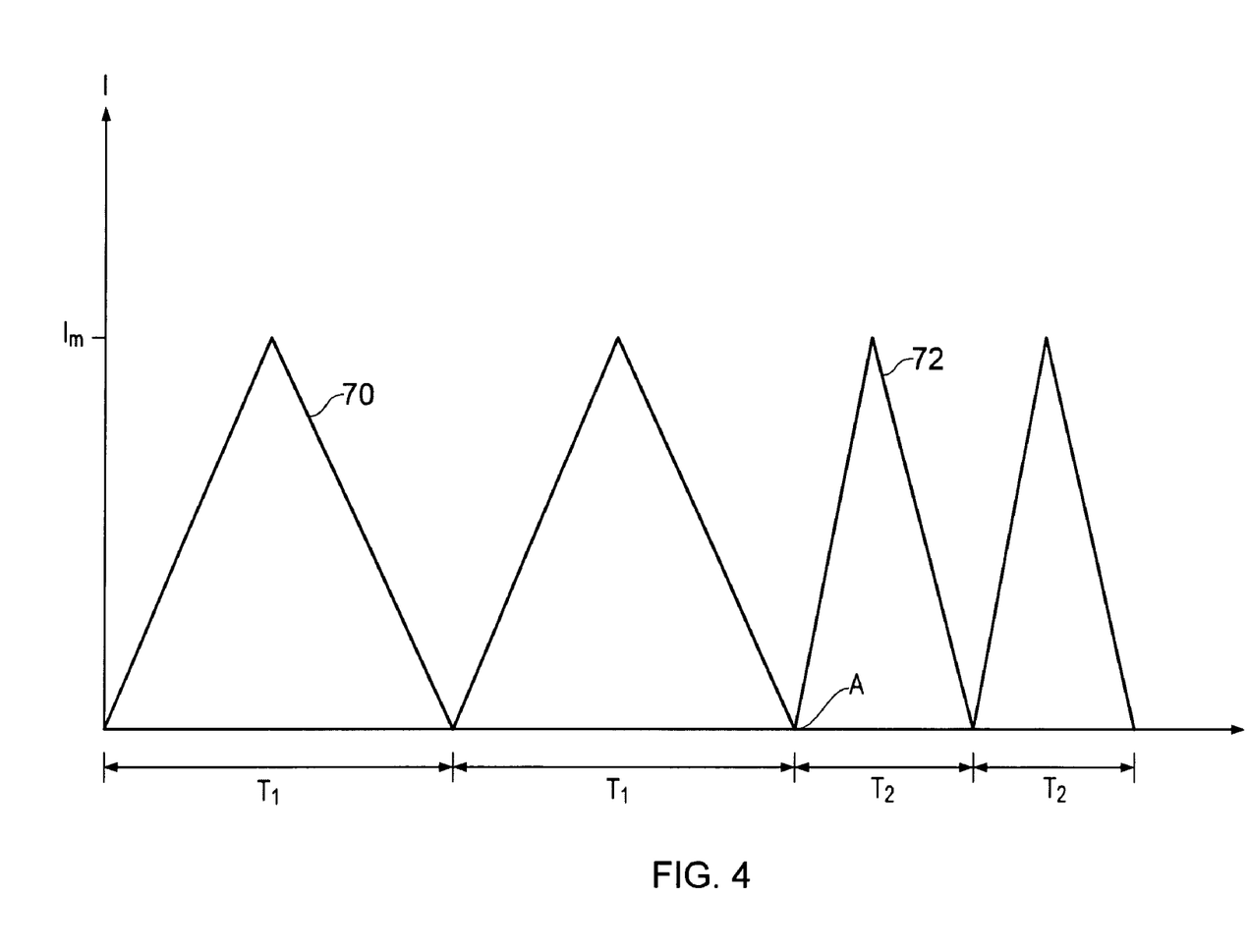
FIG. 4 is a graph illustrating a variation in output light intensity over time.

FIG. 4 is a graph that illustrates one example of a first illuminative effect 70. The figure illustrates how the intensity of light that is output by the light source 25 varies over time. At the origin of the graph, the controller 12 determines that the incoming call has been missed and controls the light source 25 to increase its output intensity over time to a maximum value $I_m$. In this particular example, the rate at which the controller 12 increases the output intensity is substantially constant, although in other implementations the output may increase monotonically and not necessary at a constant rate.

After the maximum value $I_m$ has been reached, the controller 12 controls the light source to decrease its output intensity over time to a minimum value, which in this particular case is zero. In this example, the rate at which the controller 12 decreases the output intensity is substantially constant, although in other implementations the output may decrease monotonically and not necessary at a constant rate.

Once the minimum intensity value has been reached, the controller 12 continues by periodically increasing and decreasing the output light intensity. A single period over which the output light intensity varies is represented on FIG. 4 as $T_1$. $T_1$ may be, for example, of the order of a second or two. The slow-varying nature of the output light intensity enables the user of the mobile telephone 10 to appreciate that the outer area 30 of the selection key 27 is flashing, which provides a visual indication to the user that he has missed an incoming call.

From one perspective, the time-variation in the output light intensity can be considered to provide the user with the impression that the selection key 27 is "breathing", giving the mobile telephone 10 an "organic" feel.

In the example illustrated in FIG. 4, the user does not realize that he has missed an incoming call even though the selection key 27 is flashing. For example, the user may not be able to see the mobile telephone 10.

At a point in time when the selection key 27 is still flashing, the mobile telephone 10 receives a paging message relating to a second incoming call. The user, however, does not answer the call and consequently, at block 320 of the method of FIG. 3 (point A in FIG. 4), the controller 12 determines that a second incoming call has been missed.

At block 330 of FIG. 3, in response to determining that the incoming call has been missed by the user, the controller 12 controls the light source 25 of the key arrangement 18 to produce a second illuminative effect 72. It controls the light source 25 to increase its output intensity over time to a maximum value $I_m$. In this particular example, the rate at which the controller 12 increases the output intensity is substantially constant, although in other implementations the output may increase monotonically and not necessary at a constant rate.

After the maximum value $I_m$ has been reached, the controller 12 controls the light source to decrease its output intensity over time to a minimum value, which in this particular case is zero. In this example, the rate at which the controller 12 decreases the output intensity is substantially constant, although in other implementations the output may decrease monotonically and not necessary at a constant rate.

One or more parameters of the second illuminative effect 72 differ from equivalent parameters in the first illuminative effect 70, which enables a user to visually distinguish one from the other. In the example illustrated in FIG. 4, the parameter that differs is the frequency at which the output light intensity varies. That is, the variation of the output light intensity varies at a higher frequency during the second illuminative effect 72 than during the first illuminative effect 70. The period of the second illuminative effect is $T_2$, where $T_2 < T_1$. Even though the frequency at which the output light intensity varies increases when the light source changes from providing the first illuminative effect 70 to the second illuminative effect 72, the rate of change of the output light intensity is still slow enough for the user to be able to appreciate that the selection key 27 is flashing.

Parameters that define or characterize an illuminative effect may include: the period of time for which the light source 25 outputs the maximum light intensity, the period of time for which the light source 25 outputs the minimum light intensity, the value of maximum output light intensity, the value of minimum light intensity, the time taken to increase the output light intensity from the minimum output to the maximum output, the time taken to decrease the output light intensity from the maximum output to the minimum output, the profile of the monotonic increase/decrease in light intensity between maximum output and minimum output and color. Variation in an illuminative effect involves variation in one or more of these parameters. Consequently, one or more of the parameters differ from the first illuminative effect 70 to the second illuminative effect 72 to enable them to be visually distinguished.

In the FIG. 4 example, as more incoming calls are missed by the user, the controller 12 increases the frequency at which the selection key 27 flashes. This advantageously provides the user with a visual indication of the history of events that have taken place at the mobile telephone 10 during his absence, because the number of missed calls is proportional to the speed/frequency at which the selection key 27 flashes.

Embodiments of the invention also advantageously enable a visual indication of the history of events to be provided to the user without having to provide power to the display 20 (which is typically more "power hungry" than the light source 25) and without the user having to be close enough to the mobile telephone 10 to be able to read text on the display 20.

A number of further implementations of embodiments of the invention are also possible. While the paragraphs above describe an implementation that relates to missed incoming calls, the "events" could relate to anything involving the apparatus 10. For example, the events could relate to a text/voice messages being received, or files being downloaded to the apparatus. Also, the events may or may not be of the same type. For example, the "first event" may relate to a missed incoming call, while the "second event" may relate to the reception of a text message.

In some implementations, the "events" occur at the apparatus 10, such as a signal or data being received by the receiver 16 from a remote apparatus.

In some embodiments of the invention, the illuminative effects that are provided by the light source 25 may be indicative of a current state of the apparatus 10 to a user and/or a history of events. For example, it could be that a first illuminative effect is provided after the apparatus 10 has begun to download a file at a first download speed. A second illuminative effect may be provided if the speed at which the file is being downloaded increases beyond a certain threshold. It may be that the frequency at which the key 27 flashes is dependent upon the speed of the download.

The "first event" in this case is the initialization of the download, and the "second event" is the increase in speed of the download beyond the threshold. In this example, the "second illuminative effect" indicates a current state of the apparatus 10, because it indicates the speed at which the file is being downloaded.

It should also be understood that it is not necessary for the illuminative effects to be provided through a key that is positioned on the front face of the apparatus 10. The key could be positioned anywhere on the apparatus 10, including a side face or the rear face.

Figure 5A:
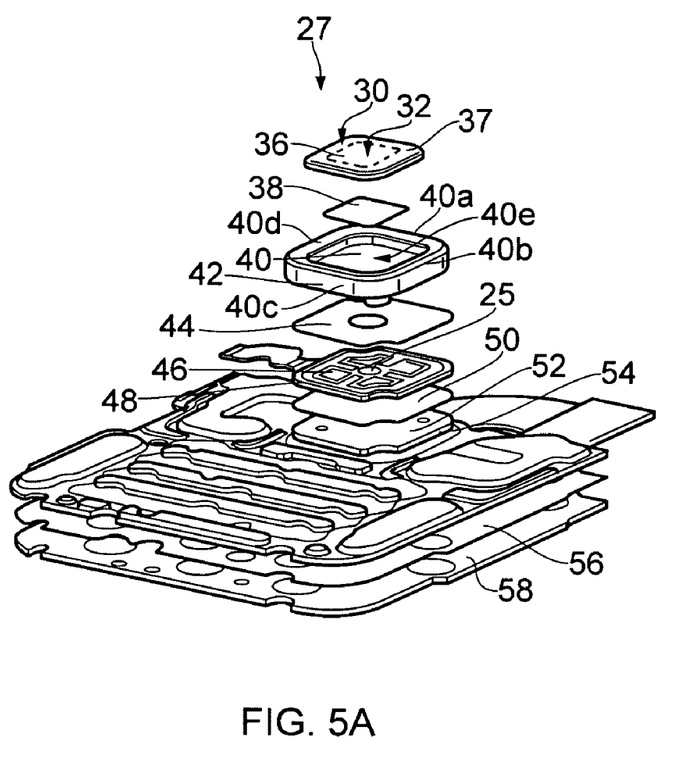
FIG. 5A is an exploded, perspective view of some keys of one implementation of the apparatus.
Figure 5B:
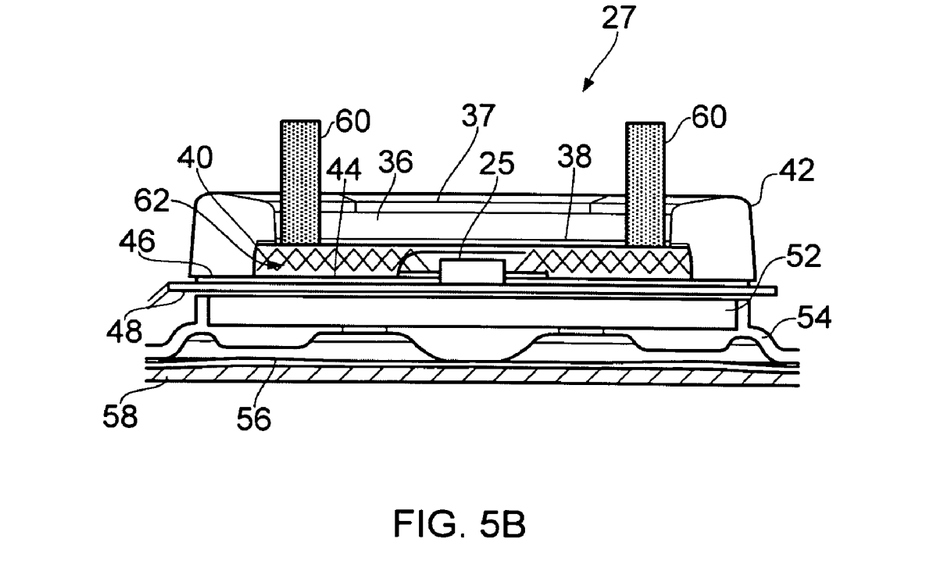
FIG. 5B is a cross-sectional side view of the keys.

FIGS. 5A and 5B illustrate the structure of one implementation of the selection key 27 and the navigation keys 26a-26d in more detail. FIG. 5A illustrates an exploded, perspective view of the navigation keys 26a-26d and the selection key 27. FIG. 5B is a cross-sectional side view of the keys 26a-26d and 27.

A dome array 56 made from metal overlies a printed wiring board (PWB) 58. A molded keymat 54 made from soft silicon material is positioned above the dome array 56 to provide actuators for the metal domes. A layer of hard polycarbonate material 52 is located on the top of the keymat 54 to provide suitable mechanical support for the upper layers of the keys 26a to 26d and 27. A "flex rigid" PWB 48 is connected to the hard polycarbonate material 52 using adhesive tape. The "flex rigid" PWB 48 provides capacitive sensors 46 for sensing user actuation.

A light source 25 (which is, in this example, a light emitting diode) is located in the center of the "flex rigid" PWB 48. A layer of adhesive tape 44 (having an upper reflective layer) is positioned on the "flex rigid" PWB 48 and around the light source 25 to connect a rigid plastic member 40 to the upper surface of the PWB 48. The outer parts 40a-40d of the rigid plastic member 40 provides the user actuable surfaces for the navigation keys 26a to 26d respectively.

The central portion 40e of the rigid plastic member 40 is clear and the outer portions 40a-40d are opaque. Preferably, the outer portions 40a-40d are colored white or light grey to enable them to reflect light emitted from the light source 25.

Adhesive tape 38 is used to adhere a rigid plastic layer 37 to the central portion 40e of the rigid plastic member 40. The lower surface of the adhesive tape 38 is also reflective, to enable it to reflect light emitted from the light source 25.

The rigid plastic layer 37 provides the user actuable surface for the selection key 27. The rigid plastic layer 37 is printed with a color (for example, black). When light emitted from the light source 25, it is transmitted through the outer portion 30 of the surface area of the rigid plastic layer 37. The inner portion 32 of the surface area is, however, configured so that no light from the light source 25 is transmitted through it. This leads to a "ring of light" being emitted from an area around the inside of the periphery of the selection key 27 when the light is emitted by the light source 25.

FIG. 5B illustrates light rays 62 leaving the light source 25 and being reflected inside the rigid plastic member 40. The light rays 62 may be reflected by the upper surface of the lower adhesive tape 44, the lower surface of the upper adhesive tape 38 and the outer portions 40a-40d of the rigid plastic member 40 before they leave the selection key 27. The shading designated with the reference numeral 60 illustrates light rays leaving the selection key 27.

Although embodiments of the present invention have been described in the preceding paragraphs with reference to various examples, it should be appreciated that modifications to the examples given can be made without departing from the scope of the invention as claimed. For example, the structure of the selection key 27 need not take the form illustrated in FIGS. 5A and 5B. It will be apparent to those skilled in the art that alternative structures could be used to implement embodiments of the invention. Also, in some alternative embodiments of the invention, the user output device 24 may not comprise a light source 25. Instead, it may comprise a speaker configured to produce an audible output.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus, comprising:
a radio frequency receiver;
at least one processor; and
at least one memory storing a computer program comprising computer program instructions that, when executed by the at least one processor, cause at least the following to be performed:
controlling, in response to the occurrence of a first attempt by a user of another apparatus to contact a user of the apparatus via the radio frequency receiver, at least one light source to produce a first, time-varying, illuminative effect that varies between maxima and minima of illumination intensity over a period of time following the occurrence of the first attempt, wherein the variation in the first illuminative effect is indicative to the user of the apparatus that the first attempt has occurred; and
controlling, in response to the occurrence of a second attempt by a user of another apparatus to contact the user of the apparatus via the radio frequency receiver following the occurrence of the first attempt, the at least one light source to produce a second, time-varying, illuminative effect that varies between maxima and minima of illumination intensity over a period of time following the occurrence of the second attempt, wherein the variation in the second illuminative effect is indicative to the user of the apparatus that both the first attempt and the second attempt have occurred.

2. An apparatus as claimed in claim 1, further comprising a display, wherein the at least one light source is different from the display and separated from the display.

3. An apparatus as claimed in claim 1, wherein the illumination intensity provided during the first illuminative effect varies in accordance with a first frequency, and the illumination intensity provided during the second illuminative effect varies in accordance with a second frequency.

4. An apparatus as claimed in claim 1, further comprising the at least one light source.

5. An apparatus as claimed in claim 1, wherein a period of time separates the first attempt to contact the user of the apparatus via the radio frequency receiver and the second attempt to contact the user of the apparatus frequency receiver.

6. An apparatus as claimed in claim 1, wherein the first attempt to contact the user of the apparatus via the radio frequency receiver is a first received message and the second attempt to contact the user of the apparatus via the radio frequency receiver is a second received message.

7. An apparatus as claimed in claim 1, wherein the first attempt to contact the user of the apparatus via the radio frequency receiver is a first voice call and the second attempt to contact the user of the apparatus via the radio frequency receiver is a second voice call.

8. A method, comprising:
controlling at least one light source of an apparatus, in response to the occurrence of a first attempt by a user of another apparatus to contact a user of the apparatus via a radio frequency receiver of the apparatus, to produce a first, time-varying, illuminative effect that varies between maxima and minima of illumination intensity over a period of time following the occurrence of the first attempt, wherein the variation in the first illuminative effect is indicative to the user of the apparatus that the first attempt has occurred; and
controlling the at least one light source, in response to the occurrence of a second attempt by a user of another apparatus to contact the user of the apparatus via the radio frequency receiver following the occurrence of the first attempt, to produce a second, time-varying, illuminative effect that varies between maxima and minima of illumination intensity over a period of time following the occurrence of the second attempt, wherein the variation in the second illuminative effect is indicative to the user of the apparatus that both the first attempt and the second attempt have occurred.

9. A method as claimed in claim 8, wherein the illumination intensity provided during the first illuminative effect varies in accordance with a first frequency, and the illumination intensity provided during the second illuminative effect varies in accordance with a second frequency.

10. A method as claimed in claim 8, wherein a period of time separates the first attempt to contact the user of the apparatus via the radio frequency receiver and the second attempt to contact the user of the apparatus via the radio frequency receiver.

11. A method as claimed in claim 8, wherein the first attempt to contact the user of the apparatus via the radio frequency receiver is a first received message and the second attempt to contact the user of the apparatus via the radio frequency receiver is a second received message.

12. A method as claimed in claim 8, wherein the first attempt to contact the user of the apparatus via the radio frequency receiver is a first voice call and the second attempt to contact the user of the apparatus via the radio frequency receiver is a second voice call.

13. A non-transitory computer-readable storage medium storing a computer program comprising computer program instructions that, when executed by at least one processor, cause at least the following to be performed:
controlling at least one light source of an apparatus, in response to the occurrence of a first attempt by a user of another apparatus to contact a user of the apparatus via a radio frequency transceiver of the apparatus, to produce a first, time-varying, illuminative effect that varies between maxima and minima of illumination intensity over a period of time following the occurrence of the first attempt, wherein the variation in the first illuminative effect is indicative to the user of the apparatus that the first attempt has occurred; and
controlling the at least one light source, in response to the occurrence of a second attempt by a user of another apparatus to contact the user of the apparatus via the radio frequency transceiver following the occurrence of the first attempt, to produce a second, time-varying, illuminative effect that varies between maxima and minima of illumination intensity over a period of time following the occurrence of the second attempt, wherein the variation in the second illuminative effect is indicative to the user of the apparatus that both the first attempt and the second attempt have occurred.

14. An apparatus, comprising:
   means for receiving radio frequency signals; and
   means for controlling light emitting means, in response to the occurrence of a first attempt by a user of another apparatus to contact a user of the apparatus via the means for receiving radio signals, to produce a first, time-varying, illuminative effect that varies between maxima and minima of illumination intensity over a period of time following the occurrence of the first attempt, wherein the variation in the first illuminative effect is indicative to the user of the apparatus that the first attempt has occurred; and
   means for controlling the light emitting means, in response to the occurrence of a second attempt by a user of another apparatus to contact the user of the apparatus via the means for receiving radio signals following the occurrence of the first attempt, to produce a second, time-varying, illuminative effect that varies between maxima and minima of illumination intensity over a period of time following the occurrence of the second attempt, wherein the variation in the second illuminative effect is indicative to the user of the apparatus that both the first attempt and the second attempt have occurred.

15. An apparatus, comprising:
   a radio frequency receiver;
   a display;
   a key arrangement, separated from the display, the key arrangement comprising at least one key different from the display and at least one light source different from the display, wherein the at least one light source is incapable of displaying text and is configured to transmit light through a surface of the at least one key; and
   a processor configured, in response to the occurrence of a first attempt by a user of another apparatus to contact a user of the apparatus via the radio frequency receiver, to control the at least one light source to provide a first illuminative effect, indicating to the user of the apparatus that the first attempt has occurred, and configured, in response to the occurrence of a second attempt by a user of another apparatus to contact the user of the apparatus via the radio frequency receiver following the occurrence of the first attempt, to control the at least one light source to provide a second illuminative effect, indicating to the user of the apparatus that both the first attempt and the second attempt have occurred.

16. An apparatus as claimed in claim 15, further comprising an exterior housing portion that separates the display from the key arrangement.

17. An apparatus as claimed in claim 15, wherein the at least one key is one of a plurality of discrete keys in the key arrangement.

18. An apparatus as claimed in claim 15, wherein the at least one key is located on a substantially planar face of the apparatus and is separated from an adjacent portion of the substantially planar face by a recess, and the at least one key is actuable by depressing it in a direction that is substantially perpendicular to the substantially planar face.

19. An apparatus as claimed in claim 15, wherein the first illuminative effect is a time-varying effect that varies between maxima and minima of illumination intensity over a period of time following the occurrence of the first attempt to contact the user, wherein the variation in the first illuminative effect is indicative to the user of the apparatus that the first attempt has occurred, and the second illuminative effect is a time-varying effect that varies between maxima and minima of illumination intensity over a period of time following the occurrence of the second attempt to contact the user of the apparatus, wherein the variation in the second illuminative effect is indicative to the user of the apparatus that the both the first attempt and the second attempt have occurred.

20. An apparatus as claimed in claim 15, wherein a period of time separates the first attempt to contact the user of the apparatus via the radio frequency receiver and the second attempt to contact the user of the apparatus via the radio frequency receiver.

21. An apparatus as claimed in claim 15, wherein the first attempt to contact the user of the apparatus via the radio frequency receiver is a first received message and the second attempt to contact the user of the apparatus via the radio frequency receiver is a second received message.

22. An apparatus as claimed in claim 15, wherein the first attempt to contact the user of the apparatus via the radio frequency receiver is a first voice call and the second attempt to contact the user of the apparatus via the radio frequency receiver is a second voice call.

23. A method, comprising:
   controlling at least one light source of an apparatus to provide a first illuminative effect by transmitting light through a surface of at least one key of the apparatus, in response to the occurrence of a first attempt by a user of another apparatus to contact a user of the apparatus, wherein the apparatus comprises a display, the at least one key is different from the display and the at least one light source is different from the display and incapable of displaying text, and wherein the first illuminative effect indicates to the user of the apparatus that the first attempt has occurred; and
   controlling the at least one light source of the apparatus to provide a second illuminative effect by transmitting light through a surface of the at least one key of the apparatus, in response to the occurrence of a second attempt by a user of another apparatus to contact the user of the apparatus following the occurrence of the first attempt, wherein the second illuminative effect indicates to the user of the apparatus that both the first attempt and the second attempt have occurred.

24. A method as claimed in claim 23, wherein the first illuminative effect is a time-varying effect that varies between maxima and minima of illumination intensity over a period of time following the occurrence of the first attempt to contact the user of the apparatus, wherein the variation in the first illuminative effect is indicative to the user that the first attempt has occurred, and the second illuminative effect is a time-varying effect that varies between maxima and minima of illumination intensity over a period of time following the occurrence of the second attempt to contact the user of the apparatus, wherein the variation in the second illuminative effect is indicative to the user of the apparatus that both the first attempt and the second attempt have occurred.

25. A non-transitory computer-readable storage medium encoded with instructions that, when executed by at least one processor, cause the method of claim 23 to be performed.

26. A method as claimed in claim 23, wherein a period of time separates the first attempt to contact the user of the apparatus via the radio frequency receiver and the second attempt to contact the user of the apparatus via the radio frequency receiver.

27. A method as claimed in claim 23, wherein the first attempt to contact the user of the apparatus via the radio frequency receiver is a first received message and the second attempt to contact the user of the apparatus via the radio frequency receiver is a second received message.

28. A method as claimed in claim 23, wherein the first attempt to contact the user of the apparatus via the radio frequency receiver is a first voice call and the second attempt to contact the user of the apparatus via the radio frequency receiver is a second voice call.

29. An apparatus, comprising:
a radio frequency receiver;
at least one processor; and
at least one memory storing a computer program comprising computer program instructions that, when executed by the at least one processor, cause at least the following to be performed:
controlling, in response to the occurrence of a first attempt by a user of another apparatus to contact a user of the apparatus via the radio frequency receiver, at least one light source to transmit light through a surface of at least one key to produce a first, time-varying, illuminative effect that varies between maxima and minima of illumination intensity over a period of time following the occurrence of the first attempt, wherein the variation in the first illuminative effect is indicative to the user of the apparatus that the first attempt has occurred; and
controlling, in response to the occurrence of a second attempt by a user of another apparatus to contact the user of the apparatus via the radio frequency receiver following the occurrence of the first user attempt, the at least one light source to transmit light through a surface of the at least one key to produce a second, time-varying, illuminative effect that varies between maxima and minima of illumination intensity over a period of time following the occurrence of the second attempt, wherein the variation in the second illuminative effect is indicative to the user of the apparatus that both the first attempt and the second attempt have occurred.

\* \* \* \* \*